Figure 1:
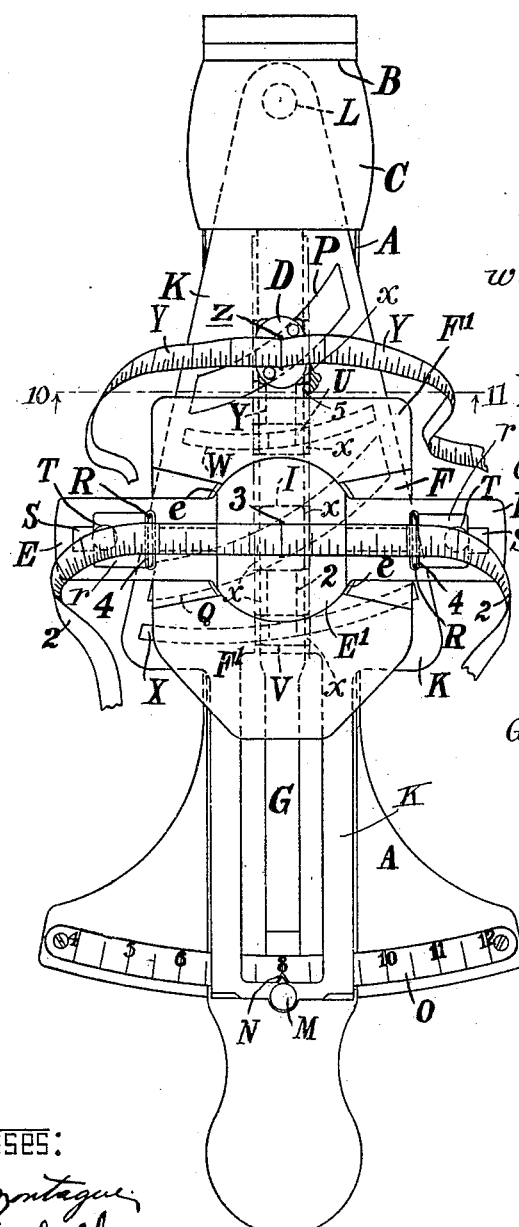

W. CHURCH.
MEASURING APPARATUS FOR BOOTMAKERS.
APPLICATION FILED AUG. 24, 1908.

962,744.

Patented June 28, 1910.
2 SHEETS—SHEET 1.

Witnesses:

Inventor:
William Church,
by Dodge & Sons,
Associate Attys.

W. CHURCH.
MEASURING APPARATUS FOR BOOTMAKERS.
APPLICATION FILED AUG. 24, 1908.
962,744.
Patented June 28, 1910.
2 SHEETS—SHEET 2.
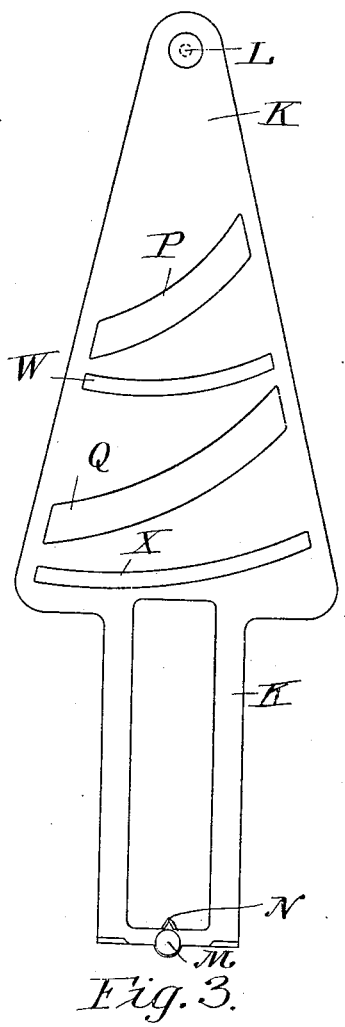
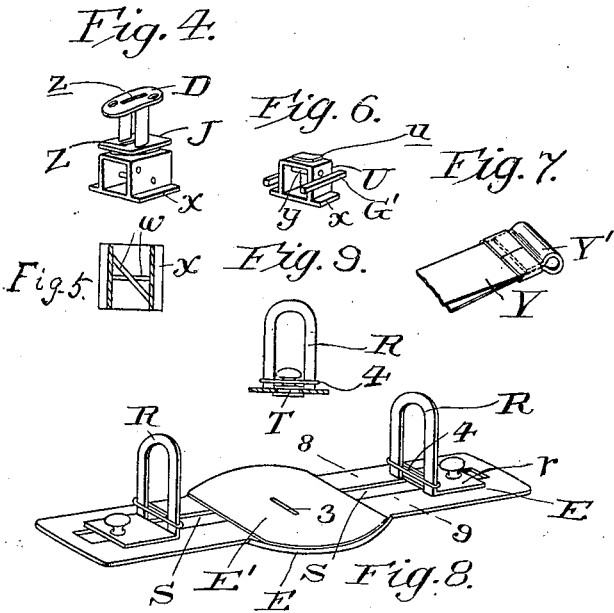
Witnesses
Parker Dodge
Fannie Wise
Inventor:
William Church,
by Dodge and Sons,
Associate Attys.

UNITED STATES PATENT OFFICE.

WILLIAM CHURCH, OF NORTHAMPTON, ENGLAND.

MEASURING APPARATUS FOR BOOTMAKERS.

962,744.  Specification of Letters Patent.   Patented June 28, 1910.

Application filed August 24, 1908. Serial No. 450,045.

*To all whom it may concern:*

Be it known that I, WILLIAM CHURCH, a subject of the King of Great Britain, residing at Northampton, in the county of Northampton, in the Kingdom of England, have invented certain new and useful Improvements in Measuring Apparatus for Bootmakers.

My present invention relates to size measuring sticks for boot and shoe dealers, and comprises a device whereby the length of a foot or last is measured directly in shoe sizes, and whereby tapes for measuring the girth of the ball joint and of the instep are properly positioned for the taking of these measurements, and so adjusted that the measurement taken upon the tapes may be taken directly in sizes, due compensation being made for the variation of these sizes, with the various lengths of shoe.

With these objects and others which will hereinafter appear, in view, my apparatus consists of the devices illustrated in the drawings, wherein—

Figure 2:
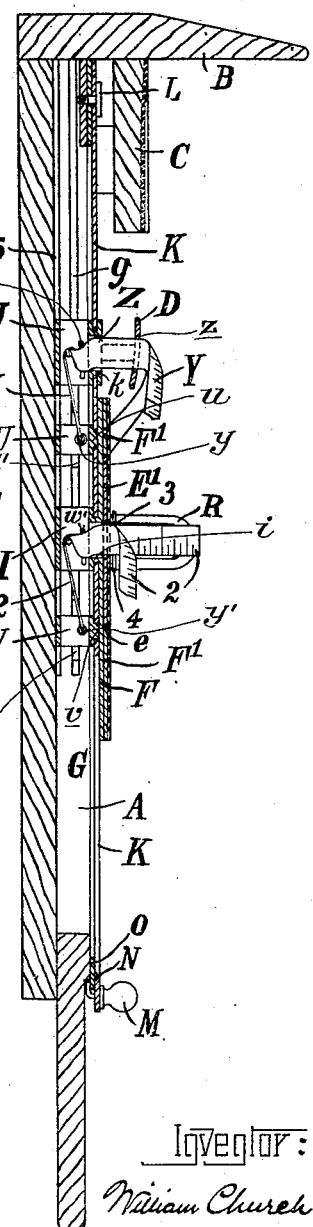

Figure 1 is a plan view of the entire apparatus; and Fig. 2 is a longitudinal sectional view of the apparatus on the center line of Fig. 1. Fig. 3 is a plan view of the actuating lever showing the cam slots; Fig. 4 is a perspective view of the instep supporting member removed from the device; Fig. 5 is a horizontal section of the same; Fig. 6, is a perspective view of one of the tape carrying sliding members; Fig. 7 is a perspective view of a tape showing the means of attaching it to the sliding member shown in Fig. 6; Fig. 8 is a perspective view of the swiveling portion E' of the ball joint support; Fig. 9 is a cross section on the line 8—9 of Fig. 8; and Fig. 10 is a cross section of the assembled device on the line 10—11 of Fig. 1 and in the direction of the arrows.

The usual measuring stick consists merely of a base bar having at one end a fixed upright against which the heel of the foot is placed, and an upright member slidably mounted upon the base bar and adapted to be brought against the toe of the foot, the length of the foot being measured upon graduations marked on the base stick.

In my present invention the length of the shoe is determined by measuring the distance from the back of the heel to the ball joint of the foot, there being a definite relation between this distance and the size of shoe required. I provide also a means of measuring about the ball joint of the foot, so as to determine the width of shoe required, the apparatus being so arranged that the girth reading taken upon the measuring tape provided for that purpose shall be directly in width sizes.

In the system of sizes commonly used in America, the lasts vary one-third of an inch in length and one-fourth of an inch in girth at the ball joint and instep. Thus in succeeding sizes the lengths have constant increments of one-third of an inch and the girths at the ball joint and instep have constant increments of one-fourth of an inch. A 5D shoe and a 6D shoe do not have, however, the same girths at the ball joint and instep respectively, though designated by the same width letter D, and this fact follows throughout the entire system of measurement. It is therefore necessary if the girth measurements are to be taken directly in sizes of width, that due compensation be made for this fact, and I accomplish this purpose by a device to appropriately draw in or pay out the tapes as the length measurement varies.

A similar provision is made for the measurement at the instep as is made for the measurement of the ball joint, and in fact might be made for any girth measurement that might be required.

Referring now particularly to Figs. 1 and 2, it will be seen that the apparatus is carried upon a bar A which forms a base therefor. Fixed to one end of the bar A is an upright member B against which the heel is placed. This bar B supports a small platform C adapted to support the heel at a suitable elevation, it being desirable to have the foot in approximately the position it will assume when in a shoe. This platform C is therefore placed at such a height as to correspond with the average height of shoe heel.

The ball of the foot will be supported by a platform E further to be described, and the instep will be supported by a platform D.

The bar A (see Fig. 10) is provided with a slot G which is further provided with smaller lateral grooves *g* formed in its sides for purposes which will later become apparent, and with a second and parallel pair of grooves 5 also formed in its sides. The grooves 5, as indicated in the drawings are formed at the bottom of the slot G, while the grooves $g$ are at a slightly higher position. Guided in the slot G so as to move longitudinally of the bar A are four sliding members which will now be taken up in order.

The first of the sliding members J (see Figs. 4 and 5) consists of a block having lateral projections $x$ entering the grooves 5. These projections thus serve to retain the member J in the slot G, preventing its displacement therefrom, and constraining it to rectilinear motion in the groove. It carries on its upper face a spindle or neck $k$ having a reduced cross section and adapted to engage a cam slot later to be described. Attached to and forming an extension of the spindle $k$ is an upwardly projecting portion terminating in the platform or support D, which serves as an instep support, its elevation being such as to adapt it to that purpose. The block J is further hollowed out for the passage of a tape, and contains guiding members consisting of the pins $w$ so disposed as to give a tape a quarter turn and allow it to pass upwardly smoothly through an aperture or slot Z in the neck $k$ and a second slot $z$ in the support D directly above.

Forward from the member J is a second sliding member U also guided in the slot G. This member U is provided with projections G′ engaging the lateral grooves $g$ and lateral projections $x$ engaging the grooves 5, both adapted to retain said sliding member U within the slot. The projections G′ might extend beyond the member U, as shown in the drawings, for the purpose of getting a longer bearing and securing smoother motion of the member U. Since these projections would lie wholly within the grooves $g$ they would not interfere or collide with the sliding member J. The sliding member U carries on its upper face a lug or projection $u$ adapted to engage a cam slot which will later be described. Passing horizontally through the member U is a pin $y$ to which is attached at approximately its middle a tape Y, the tape being attached to the pin by means of a metallic clip Y′ (see Fig. 7) or any other suitable manner. The ends of this tape are passed rearwardly through the guides already described, in the member J, and upwardly through the slot Z to the upper surface of the platform D, from which the ends of the tape Y project. These tapes are graduated at intervals appropriate to variations in instep girth for successive sizes.

I is a third sliding member guided in the slot G and retained therein by the lateral projections $x$ engaging the grooves 5. Projecting from the upper portion of the sliding member I is a neck or spindle $i$ adapted to engage a cam slot later to be described. Resting upon this neck or spindle is a plate F. Swiveled upon the plate F is a second plate E, the ball joint support, consisting of a central member E′ approximately circular in form, having beveled edges $e$. This central member E′ is retained upon the plate F by segments F′ overlapping beveled portions of E′. In this way the swiveling of the ball joint support E upon the plate F is secured through a limited range. As will be seen by reference to the drawings, the ball joint support E comprises also two bars or projections extending in opposite directions from the central portion E′ and provided with slots S running in the direction of their length, the purpose of which will be later described. It is seen, therefore, that we have a platform E adapted to support the ball joint of the foot guided longitudinally of the bar A by the slot G and adapted at the same time to be swiveled about its central point so as to assume any desirable angle with the slot G within a limited range. The height of this ball joint support is determined relatively to the instep support D and heel support C, so as to retain the foot in its normal position when in a shoe. The member I is, like the member J, hollowed out and is provided with guides $w'$ for a tape essentially identical with the guides $w$ above described, so disposed as to give a tape a quarter turn and direct it smoothly upward through a slot 3 extending through the spindle $i$ and terminating in the upper surface of the central portion E′ of the ball joint support E.

V is a fourth sliding member guided in the slot G and retained therein by lateral projections G′ engaging the grooves $g$, and by lateral projections $x$ engaging the grooves 5, the projections G′ extending preferably beyond the length of the member V so as to secure a longer bearing, as explained in the case of the sliding member U, with which it is practically identical. The member V carries a lug or projection $v$ adapted to engage a cam slot later to be described. A pin $y'$ passes horizontally through the member V and to this is attached at approximately its middle, a tape 2, the ends of which are then passed rearwardly around the guides described in the member I and upwardly through the slot 3 so as to project from the upper surface of the ball joint support E at its center. The mode of attaching the tape 2 to the pin $y'$ is the same as the method of attaching tape Y to its corresponding pin $y$. This tape 2 is graduated in divisions corresponding to the variations of girth of the ball joint with the successive width sizes. At this point I desire particularly to point out that these tapes might be graduated in accordance with any system of measurement, and that by describing the one in common use in America, I do not intend to restrict myself to that system, but use it merely as an illustration of the applicability of my device. It is furthermore not essential that the members U and V be placed forward of the members J and I respectively, as they might be placed on either side according to the preference of the person constructing the device and the limitations of space imposed.

Having now described the instep support D and the ball joint support E it now becomes necessary to set forth the means provided for moving them simultaneously to appropriate positions to support the instep and ball joint.

Pivoted at L to the bar A is an arm K which may be formed of sheet metal. This arm is provided with four cam slots, shown best in Fig. 3, and lettered P, W, Q, and X. The slot P engages the spindle or neck $k$ of the sliding member J and the cam slot Q engages the neck or spindle $i$ of the sliding member I. These slots are so designed with respect to each other that when the ball joint support E comes beneath the ball joint of the foot, the instep support D will come beneath the instep of the foot, there being a fixed relation between the positions of the instep and the ball joint in a normal foot which is well recognized. It is thus obvious that the swinging of the arm K from side to side will cause the supports D and E to move longitudinally of the bar A so as to simultaneously assume their proper positions. The bar A carries at its forward end a graduated sector scale O and the arm K which is moved by the handle M carries a pointer N swinging over this sector scale. The scale is divided so that the pointer shall indicate thereon the size of shoe corresponding to the position of the ball joint support. This is the means provided for indicating the length of shoe required from the position of the ball joint support relatively to the heel.

The cam slots W and X engage the lugs or projections $u$ and $v$ on the sliding members U and V, and are so formed that the member U moves with a definite relation to the member J and the member V moves with a definite relation to the member I according to their individual purposes. The purpose of the relative movements of U with respect to J is to vary the amount of tape extending between them, and thereby to vary the portion of tape projecting from the slot Z. The relative movements of the two sliding members U and J is such that the paying out or drawing in of the tapes produces the appropriate compensation for the variations of the instep girth with the shoe length. Similarly the relative movement of the sliding members I and V is such that by varying the length of that portion of the tape 2 which is stretched between them it will produce the proper paying out and drawing in of the tape 2 through the slot 3 to compensate for the variation of ball joint girth measurement with length of shoe.

Now remains to be described the purpose of the slides S mentioned as formed in the lateral projections of the ball joint support E. These slots guide side guards intended to secure an accurate positioning of the ball joint upon the support E. These guards comprise a base plate $r$ resting on the upper surface of E and having a downward projection or tongue T engaging the slots S and retained therein by a head or lateral projection $t$, or any other suitable means. Projecting upwardly from the base plate $r$ are the members R which are to be pushed against the side of the foot when it is positioned upon the member E. These projections R may be provided with elastic loops 4, under which the ends of the tape 2 are passed so as to hold them outward from the slot 3, and to keep them smooth and flat under the foot. These elastics 4 are not essential, however, to a satisfactory embodiment of the apparatus.

The method of using the device is as follows:—The customer places his heel upon the platform C resting it at the same time against the upper projection B. The tapes 2 and Y having been laid out to the sides, the arm K is moved to one side or the other by means of the handle M until the ball joint support E assumes its proper position beneath the ball joint of the foot, the member E being swiveled so as to assume the proper angle for either a right or left foot, and the guards R being properly adjusted, so as to secure an accurate positioning. The support E being now beneath the ball joint the platform D will be beneath the instep. The length of shoe will then be indicated upon the scale O by the pointer N. For instance in Fig. 1, the size indicated is No. 8. The ball joint measurement would next be taken by drawing the tapes 2 about the foot and reading the graduation on one end portion coincident with a fixed or terminal point on the other end portion of the tape. Because of the compensating action of the sliding members already described, this will appear directly in sizes regardless of the length of shoe. Similarly the instep measurement will be made by drawing the tape Y about the instep and reading the graduation on one end portion of the tape coincident with a fixed or terminal mark on the other end portion of the tape. It is obvious that a similar procedure will be followed out in measuring a last, to the measurement of which the apparatus is equally adapted.

It will thus be seen that in a very simple and compact apparatus I have secured means for measuring the length directly in sizes and for measuring the ball joint and instep also directly in sizes, there being no computation or allowance necessary to secure harmony between the measurement of length and the other measurements. It is obvious that the same compensating device might be applied to other girth measurements than the ones pointed out, and that the mechanism by a suitable designing of the cams could be made to compensate for any relation between the width and length measurements.

The spirit of the invention would not be changed by substituting two tapes fastened at their ends to the sliding members U and V for the one tape fastened at its middle, as described herein.

It is particularly pointed out that the cam slots W and X are formed solely with respect to a proper compensation for the measuring system adopted, and might therefore when used with a different measuring system assume radically different forms, and there is no intention to confine the claims to the form shown or to a similar form. It might be that the cam slots W would have reverse curves or sudden changes of curvature or be otherwise varied to the needs of the system at hand.

No broad claims are here made to the mechanism for indicating the shoe size by means of the position of the ball joint support, claims to cover this feature being incorporated in my co-pending application, Serial No. 436,522.

Having thus described the invention, what I claim is:—

1. A foot or last measuring apparatus, comprising in combination a base; a heel support carried thereon; an instep support slidably mounted on said base; a ball joint support slidably mounted on said base; an arm pivoted to the base; cams carried by said pivoted arm and adapted to move the instep support and the ball joint support simultaneously; and a size indicating device indicating sizes corresponding to the positions of the ball joint support.

2. A foot or last measuring apparatus, comprising in combination a base; a heel support carried thereon; an instep support slidably mounted on said base; a ball joint supporting member slidably mounted on said base; a supporting plate pivotally mounted thereon; adjustable side guides mounted upon the supporting plate; an independent sliding member mounted on the base; a tape attached to said independent member and passing through a slot in the instep support; a second independent sliding member mounted on said base; a tape attached to said second independent sliding member and passing through a slot in the ball joint support; an arm pivoted to said base; cams carried on said arm and adapted to move the instep support, the ball joint support and the two independent sliding members; and a size indicating device operatively connected to the sliding supports.

3. A foot or last measuring apparatus, comprising in combination a base; a heel support carried thereon; an instep support slidably mounted on said base; a ball joint support slidably mounted on said base; an independent sliding member mounted on the base; a measuring tape attached to said independent sliding member and passing through a slot in the instep support; a second independent sliding member mounted on the base; a measuring tape attached to said second independent sliding member and passing through a slot in the ball joint support; an arm pivoted to said base; cams carried on said arm and adapted to move the instep support, the ball joint support and the two independent sliding members; and a size indicating device operatively connected to the sliding supports.

4. A measuring apparatus for lasts and feet, comprising a base; a positioning member for the heel mounted on the base; a sliding member mounted on said base; an arm pivoted to said base and operatively connected to said sliding member; a graduated scale fixed on said base; and a pointer fixed on the arm and swinging over said graduated scale.

5. A ball joint measuring device for foot and last measuring apparatus, comprising a slidably mounted carriage; a supporting plate pivotally mounted on said carriage; a tape guided by said supporting plate; and side guards slidably mounted on said supporting plate.

6. A measuring apparatus for lasts and feet, comprising in combination a base; a positioning member for the heel mounted thereon; a support for the ball joint slidably mounted upon the base; an independent sliding member mounted upon the base; a measuring tape attached to said independent member and passing through a slot in the ball joint support; an arm pivotally mounted on the base; cams carried on said arm and adapted to move the ball joint supporting member, and the independent sliding member as the arm is swung about its pivot; and a size indicating mechanism operatively connected to said ball joint supporting member.

In testimony whereof, I have hereunto signed my name this 13th day of August 1908, in the presence of two subscribing witnesses.

WILLIAM CHURCH.

Witnesses:
JOHN FRANKLAND MANSON,
M. DIXON.